United States Patent [19]

Page

[11] 4,101,208
[45] Jul. 18, 1978

[54] OPHTHALMIC DEVICE FOR TENSIONALLY SECURING LENSES THERETO

[76] Inventor: Louis J. Page, 191-21 Hillside Ave., Hollis, N.Y. 11423

[21] Appl. No.: 760,184

[22] Filed: Jan. 17, 1977

[51] Int. Cl.² .............................................. G02C 9/04
[52] U.S. Cl. ...................................................... 351/58
[58] Field of Search ........................ 351/47, 48, 57, 58

[56] References Cited

U.S. PATENT DOCUMENTS 2,159,710  5/1939  Reichert ................................. 351/58

FOREIGN PATENT DOCUMENTS 271,692  11/1950  Switzerland ............................ 351/58

*Primary Examiner*—Paul A. Sacher

[57] ABSTRACT

An ophthalmic device having rim members for securing a pair of primary lenses thereto for distant vision, the upper portion of the rim members being located above eye level when worn, at least one pair of auxiliary lenses being tensionally and releasably attached to the device in a piggy-back arrangement, and extending over the primary lenses, preferably over the rear thereof, and of such a prescription so that the prescription of the combined lenses, primary and auxiliary, provides a bifocal or multifocal lens arrangement, the means for releasably attaching the auxiliary lenses to the rim member being a pair of bracket members attached to the side portions of the rim members, at least one of the bracket members being resilient and capable of spring action, so that at least one of the bracket members will yield relative to the other bracket member, the auxiliary lenses having notches formed in the side portions thereof, the bracket members and the notches in the auxiliary lenses being arranged so that the auxiliary lenses can be snapped onto the bracket members, the bracket members releasably engaging the notched portions of the auxiliary lenses whereby the auxiliary lenses can be interchanged with other lenses for different purposes by the wearer of the device and by removing the auxiliary lenses from the device, the primary lenses become full field distant lenses.

10 Claims, 11 Drawing Figures

OPHTHALMIC DEVICE FOR TENSIONALLY SECURING LENSES THERETO

This invention relates to ophthalmic devices for persons requiring lenses for near vision or for persons requiring a different lens prescription for near vision than that required for distant vision.

The usual means of correcting distant and near anomalies of vision is by either two pairs of eyeglasses, one pair for distant vision and one pair for near vision or by bifocal lenses. The two pair arrangement is not entirely satisfactory or convenient since the wearer must constantly change from one pair to the other for different visual requirements. Bifocal lenses are not accepted by some people because the reading section of the lenses interferes with their ability to walk, go down stairs and for other reasons generally known in the art.

The object of this invention is to overcome these faults and disadvantages. One of the main objects of this invention is to provide an ophthalmic device wherein the reading lens portion of the eyeglasses can be removed or interchanged by the wearer so that lenses can be prescribed for different reading distances such as for very close use, for general reading or for hobbies such as painting or card playing which require an intermediate visual range. In addition, the auxiliary reading lenses can be detached from the device by the wearer so that the eyeglasses become full field distant lenses and as such, when the wearer looks down, the ground or floor will not be blurred and objects will not appear displaced as is the case with bifocal lenses. Another object is that any number of arrangements of the combination of the lenses can be made by the wearer such as the primary lenses can be plano lenses tinted or colored for those not requiring a prescription for distant vision but requiring lenses for reading. Another feature is that persons having sub-normal vision and require unusally strong lenses can be better fitted. Another feature of my invention is that the auxiliary lenses can be processed having more than one notch on each side of the lens, each notch being separated vertically, whereby the auxiliary lenses can be inserted in the device in a raised or lowered position relative to the distant lenses. In addition more than one pair of auxiliary lenses can be releasably attached to the device for different occupational needs. An example of such a need is when a person's occupation requires reading meters that are located high above the line of usual vision needs and at a distance that requires a different prescription from that of his distant vision requirements, and then, he reads or writes down the readings form the meters.

Another feature of my invention is that the cost of the lenses in applicant's arrangement is generally about one third the cost of bifocal lenses, since most of the single vision lenses are stock lenses and are made in large number of prescriptions, whereas most bifocal lenses are individually ground to prescription. In addition the quality of prescription bifocal lenses cannot and do not match the quality of stock single vision lenses. This is especially true of plastic lenses which have increased in demand more than glass lenses. Another advantage of using single vision lenses over bifocal lenses is the time element. Single vision lenses usually are sent out the same day they are ordered whereas bifocal lenses usually take from 4 to 7 days. Another feature is that persons working at hazardous occupations cannot wear half eye type eyeglasses due to the F.D.A. ruling. In applicant's device the primary lenses can be plano safety lenses and the auxiliary lenses are for their near vision requirements. Another feature of the invention is that distant eyeglasses can be converted to distant sunglasses by attaching colored auxiliary lenses thereto.

These and other objects and advantages of my invention reside in the novel arrangement of the parts and features of construction which will be more fully understood from the accompanying drawing and the following description and claims.

Figure 1:
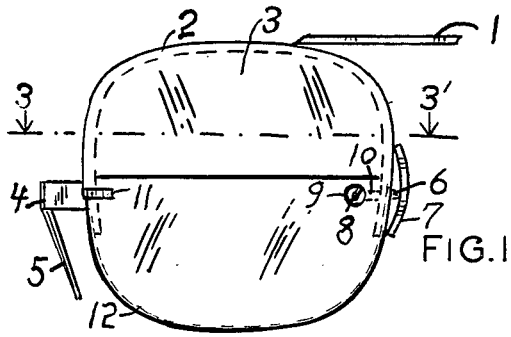
FIG. 1 is a fragmentary front plan view of the right side of an ophthalmic device embodying my invention.
Figure 2:
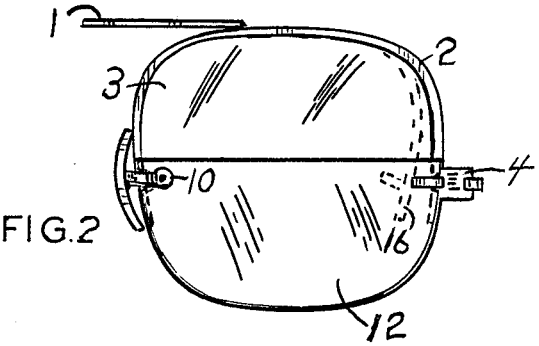
FIG. 2 is a fragmentary rear view of the device shown in FIG. 1.
Figure 3:
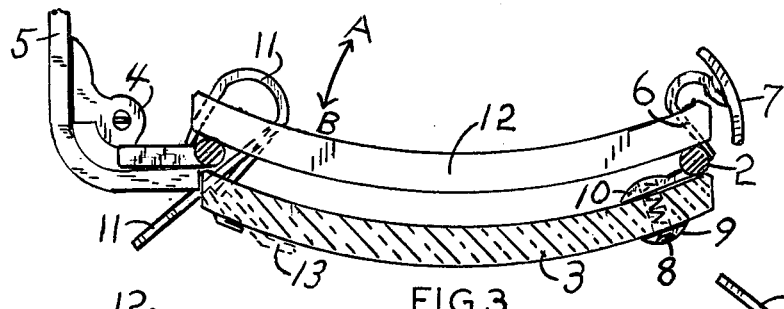
FIG. 3 is an enlarged fragmentary sectional view taken on line 3-3' of FIG. 1.
Figure 4:
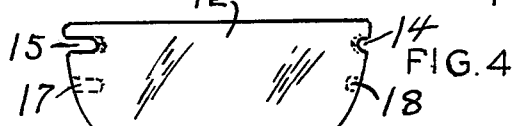
FIG. 4 is a plan view of the auxilary lens shown in FIG. I.

Referring to the drawing the same numbers refer to similar parts in the different views. In FIG. 1, the bridge member 1 is attached to the spring rim member 2. The rim member 2 is resilient and extends along the upper and partially along the side portions of the primary lens 3. A hinge member 4 is attached to the temporal side of the rim member 2 and a temple 5 is pivotally attached to the hinge 4. A nose pad arm 6 is attached to the nasal side portion of the rim member 2 and a nose pad 7 is attached to the nose pad arm 6 in the usual manner. The lens 3 is attached to the rim member 2 by means of the screw 8 which passes through the washer 9, and then through a hole provided in the lens 3 and then threaded into the lug 10 which has a tapped hole therein. The lug 10 is radially attached to the rim member 2 as shown in FIG. 3. The temporal side portion of the lens 3 is provided with a notch and the temporal side portion of the rim member 2 is provided with the bracket member 11. The bracket member 11 extends rearwardly from the rim member 2 and then turns to be redirected toward the center of the lens forming a loop and then forwardly and temporally as shown in FIG. 3. The forward portion of the bracket member 11 is of sufficient length to accommodate the thickest lens encountered. The bracket member 11 is arranged to engage in a notch formed in the temporal side edge of the lens 3 and is bent over to engage the front surface of the lens 3 by the optician. The bracket member 11 is cut off by the optician as required to remove excessive overhang of the bracket. The normal state of the bracket member 11 is shown by the dash lines 13 and provides additional spring tension to releasably secure the lens to the rim member. An auxiliary lens 12 is provided with notches 14, 15 as shown in FIG. 4. The auxiliary lens 12 is releasably attached to the rear of the rim member 2 in a piggy-back arrangement. The nasal side portion of the auxiliary lens 12 is positioned so that the notch 14 engages the portion of the nose pad arm 6 that extends rearwrdly from the rim member 2 and slightly toward the center of the lens 2 as shown in FIG. 3. The temporal side of the auxiliary lens 12 is positioned so that the notch 15 is in alignment with the bracket member 11. The temporal side portion of the auxiliary lens 12 is pressed against the curved portion of the bracket member 11 in the direction of A to B, forcing the bracket member to yield temporally allowing the auxiliary lens to enter therebetween and come to rest against the rim member 2 as shown in FIG. 3. The rim member 2 is resilient and is shown in a normal state by the dash lines 16 shown in FIG. 2, so that the primary lens 3 and the auxiliary lens 12 are releasably and tensionally secured by the bracket member 11. The depth of the notches in the lens 3 and in the auxiliary lens 12 is such that the auxiliary lens 12 can be snapped into and out of the bracket member 11 without dislodging the lens 3 from the rim member 2. The auxiliary lens 12 is detached from the rim member 2 by inserting the finger nail between the lenses at the temporal side thereof and urging the auxiliary lens 12 rearwardly in the direction of B to A. The lens 12 may have additional notches formed in the side portions thereof as shown by the dash line notches 17 and 18 in FIG. 4. When the auxiliary lens 12 is attached to the rim member 2 so that the notches 17, 18 in the auxiliary lens 12 engage the bracket members, the auxiliary lens will be located in a higher position relative to the eye when worn.

Figure 5:
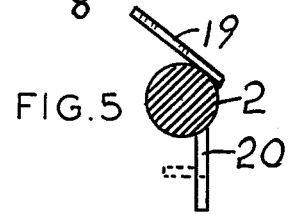
FIG. 5 is an enlarged fragmentary top sectional view of the rim member shown in FIG. 1 with modified bracket members.

In FIG. 5 is shown another arrangement of the bracket members for releasably attaching the side portions of the lens to the rim member 2. The bracket member 19 extends rearwardly and slightly inwardly toward the opposite side of the rim member 2. The bracket member 20 extends forwardly of the rim member 2 and is of such a length to accommodate the thickest lens encountered. The bracket member 20 is bent over by the optician as shown by the dash lines so that the bent over portion thereon engages the front surface of the lens. The excess portion of the bracket member 20 is cut off by the optician.

The bracket members 11, 19 and 20 shown in FIGS. 3 and 5 may be attached to the nasal side and temporal side of the rim member 2 at other vertical locations that I have shown in the drawing and more than one set of bracket members may be attached to each rim member, spaced vertically from each other so that additional auxiliary lenses may be releasably attached to the rim member 2, stacked vertically thereon providing additional multifocal lenses.

Figure 6:
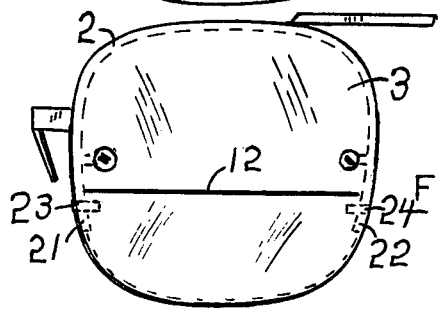
FIG. 6 is a fragmentary front plan view of a modified form of my invention.

In FIG. 6 is shown a conventional form of mounting wherein the lens 3 is attached to the rim member 2 by means of screws as described for attaching the nasal side of the lens 3 shown in FIG. 1. In this form the temporal and nasal side portions of the rim member 2 extends substantially below the attaching means as shown at 21 and 22. The portions 21 and 22 of the rim member 2 are flexible and provided with bracket members as shown at 23 and 24. The auxiliary lens 12 is provided with notches in the side portions thereof similar to the notches shown in the lens 12 in FIG. 4 and the auxiliary lens 12 is similarly attached and detached from the rim member 2, as described for the form shown in FIG. 1.

Figure 7:
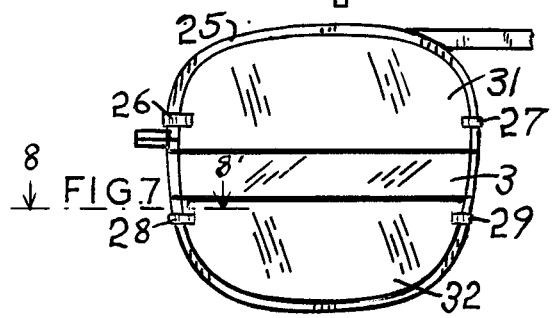
FIG. 7 is a fragmentary rear plan view of another modified form of my invention showing two auxiliary lenses.
Figure 8:
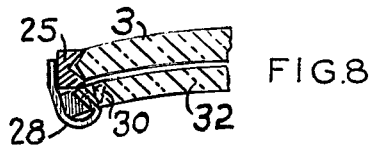
FIG. 8 is an enlarged fragmentary sectional view taken on line 8-8' of FIG. 7.
Figure 9:
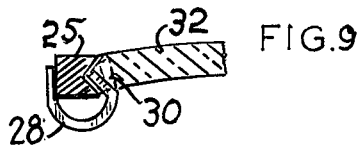
FIG. 9 is similar to the view shown in FIG. 8, showing a modified form of the bracket arrangement.

In FIG. 7 is shown another modification, the rim member 25 is provided with the usual V-shaped groove which extends along the inner surface thereof to hold the edge portion of the lens 3. The side portions of the rim member 25 have bracket members attached thereto as shown at 26, 27, 28 and 29. In FIG. 8 is shown the relationship of the rim member 25, the lens 3 and the bracket member 28. The bracket members 26, 27, 28 and 29 are formed so that in their normal state extend inwardly toward the center of the lens 3 as shown by the dash lines 30 in FIG. 8 thereby providing spring action for releasably holding the lens therein. The lenses 31, 32 have notches formed in the side portions thereof similar to those shown in the lens shown in FIG. 4. The lenses 31, 32 are each releasbly attached in the rim member 25 by placing the nasal side of the lens so that the notched portion thereof engages the corresponding side bracket member. The temporal side portion of the lens is then positioned so that the notch in the lens is in alignment with the corresponding bracket member. The lens is then pressed against the bracket member urging it to yield whereby the lens is releasably secured between the bracket members as shown in FIG. 7. In FIG. 7 two auxiliary lenses are shown. In this arrangement the eyeglasses are mainly for occupational use. The upper lens is for a more distant range than the lower lens provides. In FIG. 9 is shown the bracket member 28 which is also shown in FIG. 8, re-shaped by the optician so that the free end portion thereof is positioned in the groove of the rim member 25 as shown at 30 in FIG. 9. In this form only the lens 32 is employed and is provided with notches similar to the auxiliary lens 12 shown in FIG. 4 and in this arrangement the eyeglasses are used for near vision.

Figure 10:
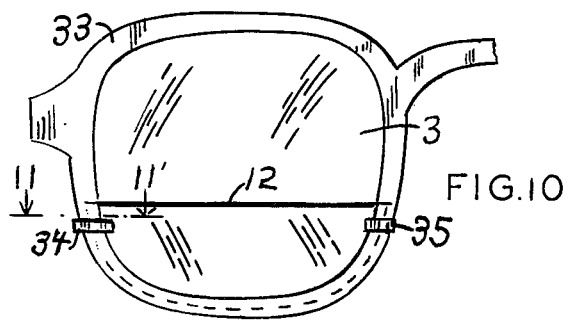
FIG. 10 is a fragmentary rear plan view of another modified form of the invention.
Figure 11:
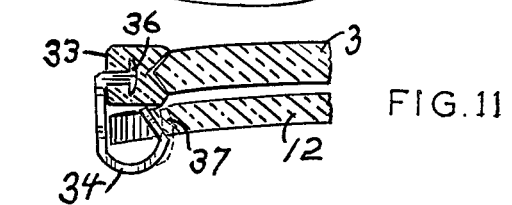
FIG. 11 is an enlarged fragmentary sectional view taken on line 11-11' of FIG. 10.

In FIG. 10 is shown another form of my invention. In this form the rim member 33 is made of a plastic material. The bracket members 34, 35 are attached to the temporal and nasal side portions of the rim member 33. One means of attaching the bracket members to the rim member is shown in FIG. 11. The bracket members 34, 35 are each provided with an enlarged head portion 36 which is embedded into a portion of the rim member 33 by heat and pressure, the enlarged head portion 36 thereon anchors the bracket member 34 therein. The bracket members 34, 35 extend rearwardly from the rim member 33 and then are redirected toward each other and then redirected toward the rear surface of the rim member 33 and toward the peripheral edge portion thereon so that the end portions of the bracket members 34,35 diverge forwardly relative to each other. An auxiliary lens 12 is prepared similarly to the lens 12 shown in FIG. 4 and is releasably inserted between the bracket members as described for the form shown in FIG. 7. The bracket members 34, 35 can be re-formed as shown at 30 in FIG. 9, in which form the eyeglasses are used for near vision. The bracket members 34, 35 have the same spring action as described for the bracket member 28 shown in FIG. 8. The bracket members 34, 35 may be attached to the rim member 33 by other suitable means.

In the several views the number of bracket members and the location of the bracket members are not limited to those in the Figures in the drawing. For example the rim member 2 shown in FIG. 1 can extend down substantially further than is shown and independent bracket members can be attached to the rim members 2 below the location of the nose pad arm and hinge similar to the arrangement and location shown in FIG. 6.

It should be particularly noted that the upper portion of the rim member is located substantially above eye level and the top edge of at least one of the auxiliary lenses is located below eye level when the eyeglasses are worn. The auxiliary lenses can be removed from the device or can be interchanged by the wearer so that lenses for different purposes can be prescribed.

In the several views and specification I have shown and described different and preferred arrangements of my invention and do not limit myself to these applications. It is understood that other modifications of my invention might be conceived embodying the general principles of this invention. From the foregoing and accompanying drawing it is apparent that I have provided an ophthalmic device in accordance with the objects of my invention.

I claim:

1. An ophthalmic device having a pair of spaced rim members connected by a bridge member, each of said rim members extending at least partially along the peripheral portion of a lens, the upper portion of said rim member being located substantially above eye level when worn, lens attaching means being attached to the nasal and temporal side portions of said rim member and having portions thereon extending rearwardly therefrom and having a spring relationship to each other so that the confronting surfaces of the attaching means can be sprung apart relative to each other and having the distance between the attaching means less than the distance between the side portions of a lens inserted therein, lenses, at least one of said lenses being provided with at least one temporal and one nasal notch formed in the respective side edge portions thereof and at least one of said lenses being attached to each of said rim members, said lens being positioned so that one of said attaching means engages the corresponding side notch in the lens, the other side of said lens being positioned so that the notched portion therein is located over the rear of the corresponding side attaching means and is pressed against the attaching means whereby the attaching means yields relative to the other of said attaching means allowing the lens to enter therein, thereby tensionally and releasably securing the lens to said rim member.

2. An ophthalmic device as set forth claim 1, wherein the rim member is made of a spring material, said rim member having lens attaching means extending from the side portions thereon, primary lenses, each of said lenses bring attached to said rim members by said attaching means, at least one of said lens attaching means being a bracket member extending rearwardly from said rim member and redirected in the form of a loop and extending forwardly and slightly outwardly, said primary lens having a notch formed in the side edge portion thereof so that the notch in the lens is in alignment with the forward portion of the bracket member, said bracket member being arranged to tensionally engage the notch in said lens, auxiliary lenses, said auxiliary lenses being positioned to the rear of said primary lenses and said rim members, each of said auxiliary lenses having at least one notch formed in each of the side edge portions thereof, one of the side portions of said rim member having attaching means to engage the notch in the corresponding side portion of the auxiliary lens, the notch formed in the opposite side portion of the auxiliary lens being positioned in alignment with the loop portion of the bracket member and rearwardly thereof, said side portion of the lens being attached thereto by pressing the lens against the rear of the loop portion of the bracket member whereby the bracket member will yield and enter the notch in the lens, thereby releasably securing the auxiliary lens between the loop portion of the bracket member and the rear of the rim member.

3. An ophthalmic device as set forth in claim 1, wherein the rim members are arranged to hold a pair of lenses before the eyes of the wearer, lenses, said lenses being for distant vision, auxiliary lenses, each of said lenses having a notch formed in the side edge portion thereof, spring bracket members, said bracket members being attached to and extend from the side portions and to the rear of said rim members, said auxiliary lenses being attached to said rim members by positioning the notch in the lens over the corresponding bracket member and then positioning the opposite side notch in the lens over the corresponding bracket member and then pressing the lens against the rear of the bracket member urging it to yield outwardly allowing the lens to enter therein, thereby tensionally and releasably securing the auxiliary lens therein.

4. An ophthalmic device as set forth in claim 3, wherein the auxiliary lenses are for near vision and positioned to the rear of distant vision lenses in a piggyback arrangement, the auxiliary lenses being formed so that the top edge portion thereof is located below eye level when the device is worn whereby the arrangement of the distant and near vision lenses provides a bifocal combination.

5. An ophthalmic device as set forth in claim 1, wherein the rim members have more than one auxiliary lens attaching means on each side of the rim members said attaching means being spaced vertically thereon so that more than one auxiliary lens may be attached to each rim member in a stacked vertical arrangement, said auxiliary lenses having different refractive powers so that the visual requirements for different reading distances is provided.

6. An ophthalmic device as set forth in claim 1, wherein the rim members are made of a non-metallic material and having a groove directed along the inner surface thereof to hold a lens therein, means for tensionally attaching auxiliary lenses to said rim members, said attacing means having a shank with an enlarged head portion thereon, said head portion being embedded into the side portion of the rim member by heat and pressure, said auxiliary lens attaching means extending rearwardly from the shank portion thereon beyond the rear surface of the rim member and then redirected in the form of a loop toward the rear surface of the rim member, the portions thereon extending toward the rear surface of the rim member diverging relative to the same portion of the opposite attaching means and said diverging portions being flexible and in their normal state are closer together than when the auxiliary lenses are assembled therein, auxiliary lenses, said auxiliary lenses having notches formed in the side portions thereof and arranged to engage the lens attaching means, whereby the auxiliary lenses are tensionally and releasably secured therein.

7. An ophthalmic device as set forth in claim 6, wherein the auxiliary lens attaching means is deformed so that the portion thereon engaging the notch formed in the lens is located within the groove of the rim member and the lens attaching means engaging the notches in the lens, and said lens being formed having the upper edge portion of the lens located below eye level when the device is worn.

8. An ophthalmic device as set forth in claim 1, wherein the rim members have suitable means for attaching lenses thereto, lenses, said lenses being secured to said rim members and having a lens prescription for distant vision correction and providing the usual full field of vision, auxiliary lenses, auxiliary lens tensional and releasable attaching means, said attaching means attaching said auxiliary lenses to the rear of said rim members and said auxiliary lenses being formed so that the upper edge thereof is located below eye level when the eyeglasses are worn, said auxiliary lenses being of such a power that when added to the distant vision lenses provides a lens correction for reading vision and said auxiliary lenses being detachable from said rim member by the wearer, whereby the eyeglasses become full field distant vision eyeglasses.

9. An ophthalmic device as set forth in claim 1, wherein the attaching means for attaching the nasal side portion of the lens to the rim member is a portion of the nose pad arm, nose pad arms, said nose pad arms being attached to the nasal side of the rim member and extending rearwardly and toward the center of the lens therein and redirected and arranged having a nose pad attached to the end portion thereof, the portion of the nose pad arm adjacent the rim member being arranged to releasably hold and engage the notch formed in the side edge portion of the lens.

10. An ophthalmic frame having a pair of spaced rim members connected by a bridge member, each of said rim members having a groove extending along the inner surface to hold a lens therein, lenses, said lenses being inserted into the groove in said rim members, spring bracket members, at least one of said bracket members being attached to the side portions of each of said rim members, said bracket members extending from said rim member and formed to engage notches formed in the side edge portions of a lens and the distance between the confronting surfaces of said bracket members being less in their normal state than the distance therebetween when lenses are carried therein, auxiliary lenses, said auxilary lenses having at least one notch formed in each of side edges thereon, said auxiliary lenses being tensionally and releasably attached to said rim members by means of said bracket members, one of said bracket members being placed into the notch formed in the auxiliary lens and a bracket member attached to the opposite side portion of said rim member being positioned in alignment with the notch formed in the opposite side of the lens so that when the lens is pressed against the rear of the bracket member, the bracket member will yield allowing the lens to enter between said spring bracket members, thereby tensionally and releasably securing the auxiliary lens therein.

* * * * *